(12) United States Patent
Bouazizi et al.

(10) Patent No.: US 9,930,086 B2
(45) Date of Patent: Mar. 27, 2018

(54) CONTENT PRESENTATION FOR MPEG MEDIA TRANSPORT

(71) Applicant: Samsung Electronics Co., Ltd., Suwon-si, Gyeonggi-do (KR)

(72) Inventors: Imed Bouazizi, Plano, TX (US); Sungoh Hwang, Yong-in-Shi (KR); YoungKwon Lim, Allen, TX (US); Kyungmo Park, Kangnam-gu (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 204 days.

(21) Appl. No.: 14/525,103

(22) Filed: Oct. 27, 2014

(65) Prior Publication Data

US 2015/0120956 A1 Apr. 30, 2015

Related U.S. Application Data

(60) Provisional application No. 61/896,577, filed on Oct. 28, 2013, provisional application No. 61/898,283, filed on Oct. 31, 2013.

(51) Int. Cl.
*G06F 15/16* (2006.01)
*H04L 29/06* (2006.01)
(Continued)

(52) U.S. Cl.
CPC .......... *H04L 65/602* (2013.01); *H04L 65/607* (2013.01); *H04N 21/236* (2013.01); *H04N 21/2381* (2013.01); *H04N 21/23439* (2013.01); *H04N 21/23614* (2013.01); *H04N 21/643* (2013.01); *H04L 67/02* (2013.01)

(58) Field of Classification Search
CPC ..................................................... H04L 65/602
See application file for complete search history.

(56) References Cited

U.S. PATENT DOCUMENTS

2005/0187968 A1* 8/2005 Dunning ........... G06F 17/30017
2007/0113289 A1* 5/2007 Blumenau ......... G06F 17/30085
726/26
(Continued)

FOREIGN PATENT DOCUMENTS

KR 10-2012-0083820 A 7/2012
WO 2013/112027 A1 8/2013

OTHER PUBLICATIONS

Kyungmo Park et al., "Working Draft of MPEG Media Transport", ISO/IEC JTC1/SC29/WG11/N12334, Dec. 3, 2011, 14 pages, XP002746417.
(Continued)

*Primary Examiner* — Michael A Keller

(57) ABSTRACT

A method for simplified MPEG Media Transport (MMT) content presentation is provided. Two or more assets of an MMT package Processing Unit (MPU) are identified. The method also includes defining at least one of the two or more assets as a default asset and a remaining one or more assets as enriched assets. The at least one default asset does not include a composition function. The method further includes configuring the at least one default asset for independent presentation from the one or more enriched assets. The method includes transmitting the MPU including the at least one default asset and the one or more enriched assets.

20 Claims, 5 Drawing Sheets

(51) Int. Cl.
*H04N 21/2343* (2011.01)
*H04N 21/236* (2011.01)
*H04N 21/2381* (2011.01)
*H04N 21/643* (2011.01)
*H04L 29/08* (2006.01)

(56) References Cited

U.S. PATENT DOCUMENTS

| | | | | |
|---|---|---|---|---|
| 2013/0028574 A1* | 1/2013 | Srinivas | ............... | G11B 27/031 386/278 |
| 2013/0298177 A1 | 11/2013 | Rhyu et al. | | |
| 2013/0336412 A1* | 12/2013 | Erofeev | ............... | G11B 27/031 375/240.28 |
| 2014/0020111 A1* | 1/2014 | Wang | ....................... | G06F 21/10 726/26 |
| 2014/0023071 A1* | 1/2014 | Park | .................. | H04L 29/06482 370/389 |
| 2014/0344470 A1* | 11/2014 | Lee | ...................... | H04N 21/236 709/231 |
| 2014/0369222 A1 | 12/2014 | Kim et al. | | |
| 2015/0113577 A1* | 4/2015 | Yie | .................... | H04N 21/2362 725/109 |

OTHER PUBLICATIONS

Communication dated May 26, 2017 in connection with European Patent Application No. 14 857 726.5.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                      MPU_sequence_number                      |
+-+-+-+-+-+-+-+-+-+-+-+-+-+-+-+-+-+-+-+-+-+-+-+-+-+-+-+-+-+-+-+-+
|                  movie_fragment_sequence_number               |
+-+-+-+-+-+-+-+-+-+-+-+-+-+-+-+-+-+-+-+-+-+-+-+-+-+-+-+-+-+-+-+-+
|                         sample_number                         |
+-+-+-+-+-+-+-+-+-+-+-+-+-+-+-+-+-+-+-+-+-+-+-+-+-+-+-+-+-+-+-+-+
|         offset          |      priority   |   dep_counter     |
+-+-+-+-+-+-+-+-+-+-+-+-+-+-+-+-+-+-+-+-+-+-+-+-+-+-+-+-+-+-+-+-+
```

FIG. 6

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                      MPU_sequence_number                      |
+-+-+-+-+-+-+-+-+-+-+-+-+-+-+-+-+-+-+-+-+-+-+-+-+-+-+-+-+-+-+-+-+
|                           item_ID                             |
+-+-+-+-+-+-+-+-+-+-+-+-+-+-+-+-+-+-+-+-+-+-+-+-+-+-+-+-+-+-+-+-+
```

CONTENT PRESENTATION FOR MPEG MEDIA TRANSPORT

CROSS-REFERENCE TO RELATED APPLICATION(S) AND CLAIM OF PRIORITY

The present application claims priority to U.S. Provisional Patent Application Ser. No. 61/898,283, filed Oct. 31, 2013, entitled "CONTENT ENT PRESENTATION FOR MPEG MEDIA TRANSPORT". The present application also claims priority to U.S. Provisional Patent Application Ser. No. 61/896,577, filed Oct. 28, 2013, entitled "CONTENT PRESENTATION FOR MPEG MEDIA TRANSPORT". The content of the above-identified patent documents are incorporated herein by reference.

TECHNICAL FIELD

The present application relates generally to transporting and presenting data and, more specifically, to transporting and presenting media type data.

BACKGROUND

MPEG Media Transport (MMT) is a standard for Multimedia Delivery in an IP environment and a non IP environment. MMT generally has four functionalities including Encapsulation, Delivery, Signaling and Composition. Among them, the purpose of composition is to provide the information required for MMT content consumption. Composition provides the spatial relation, the temporal relation, and the event based relation with HTML 5 and some tools. However, MMT can be simplified for particular types of MMT content.

SUMMARY

A method for simplified MPEG Media Transport (MMT) content presentation is provided. The method includes identifying two or more assets of an MPEG Media Transport (MMT) package Processing Unit (MPU). The method also includes defining at least one of the two or more assets as a default asset and a remaining one or more assets as enriched assets. The at least one default asset does not include a composition function. The method further includes configuring the at least one default asset for independent presentation from the one or more enriched assets. The method includes transmitting the MPU including the at least one default asset and the one or more enriched assets.

An apparatus for simplified MPEG Media Transport (MMT) content presentation is provided. The apparatus includes a processing unit. The processing unit is configured to identify two or more assets of an MPEG Media Transport (MMT) package Processing Unit (MPU). The processing unit is also configured to define at least one of the two or more assets as a default asset and the remaining one or more assets as enriched assets. The at least one default asset does not include a composition function. The processing unit is further configured to configure the at least one default asset for independent presentation from the one or more enriched assets. The apparatus also includes a transmitter. The transmitter is configured to transmit the MPU including the at least one default asset and the one or more enriched assets.

A system for simplified MPEG Media Transport (MMT) content presentation is provided. The system includes a first apparatus. The first apparatus is configured to transmit a first MPU including the at least one default asset of the first MPU and one or more enriched assets of the first MPU to a receiver of a display device. The at least one default asset of the first MPU is assigned a first position on an default asset timeline. The system also includes a second apparatus. The second apparatus is configured to transmit a second MPU including the at least one default asset of the second MPU and one or more enriched assets of the second MPU to a receiver of the display device. The at least one default asset of the second MPU is assigned a second position on the default asset timeline so that after a receiver of the display device receives the at least one default asset of the first MPU and the at least one default asset of the second MPU, the display device displays the contents of the at least one default asset of the first MPU and the contents of the at least one default asset of the second MPU at relative times on the default asset timeline determined by the first position and the second position.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 illustrates an example structure of a timed Media Fragment Unit MFU header according to this disclosure;

FIG. 7 illustrates an example structure of a non-timed media MFU header according to this disclosure.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged data communication system.

Figure 1:
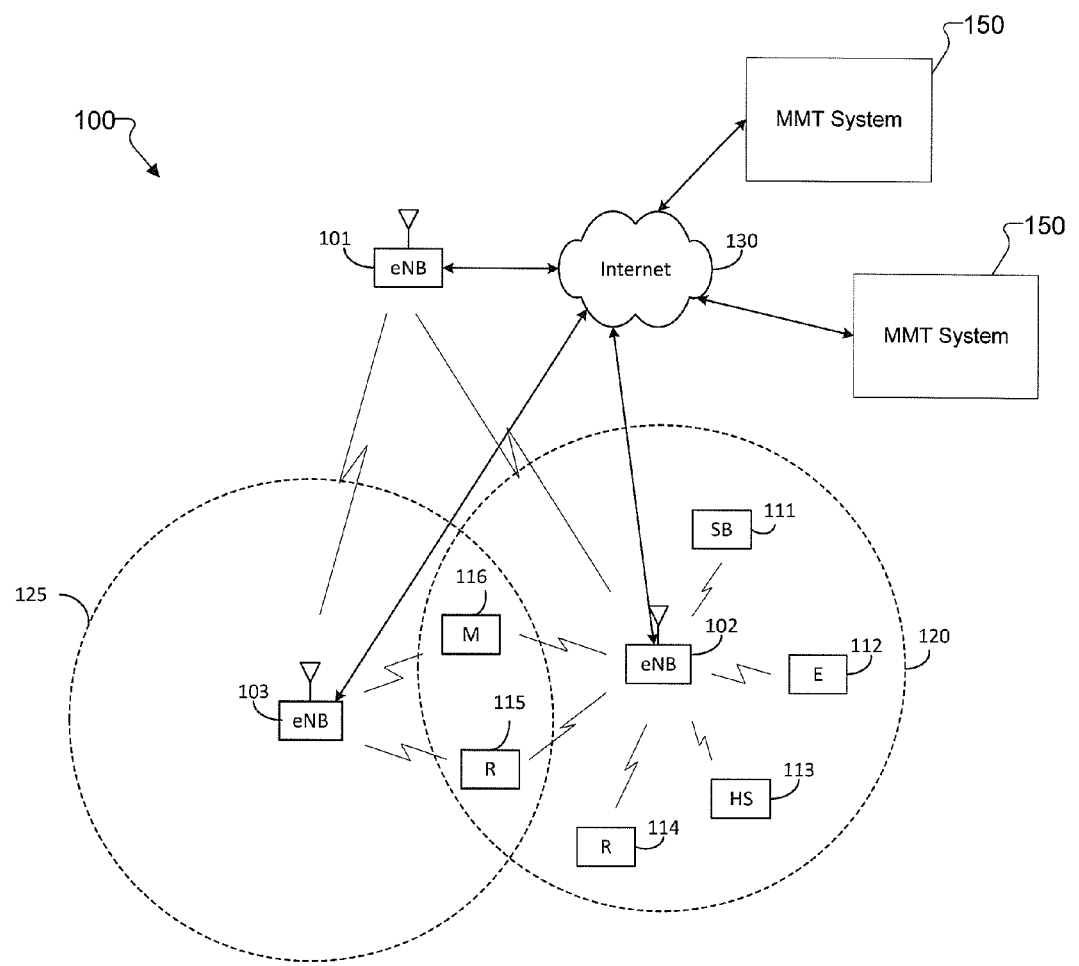
FIG. 1 illustrates an example wireless system that transmits MPEG files according to this disclosure.

FIG. 1 illustrates exemplary wireless system 100 that transmits messages according to the principles of the present disclosure. The embodiment of the wireless network 100 shown in FIG. 1 is for illustration only. Other embodiments of the wireless network 100 could be used without departing from the scope of this disclosure.

In example shown in FIG. 1, wireless system 100 includes transmission points (TP), such as enhanced Node B (eNB) 101, eNB 102, eNB 103, and other similar base stations or relay stations. The eNB 101 is in communication with eNB 102 and eNB 103. The eNB 101 also communicates with at least one Internet Protocol (IP) network 130, such as the Internet, a proprietary IP network, other data network or a similar IP-based system. The system 100 also includes at least one MPEG Media Transport (MMT) system 150 for simplified MMT content presentation.

Depending on the network type, other well-known terms may be used instead of "transmission point," "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The wireless network 100 includes a DownLink (DL) that conveys signals from transmission points (TPs), such as eNBs to UEs and an UpLink (UL) that conveys signals from UEs to reception points such as eNBs. DL signals include data signals conveying information content, control signals conveying DL Control Information (DCI), and Reference Signals (RS), which are also known as pilot signals. The eNB transmits data information or DCI through respective Physical DL Shared CHannels (PDSCHs) or Physical DL Control CHannels (PDCCHs). Possible DCI formats used for downlink assignment include DCI format 1A, 1B, 1C, 1D, 2, 2A, 2B, 2C and 2D. A UE can be configured with a transmission mode which determines the downlink unicast reception method for the UE. For a given transmission mode, a UE can receive unicast downlink assignment using DCI format 1A and one of DCI format 1B, 1D, 2, 2A, 2B, 2C or 2D. An eNB transmits one or more of multiple types of RS including a UE-Common RS (CRS), a Channel State Information RS (CSI-RS), and a DeModulation RS (DMRS). A CRS is transmitted over a DL system BandWidth (BW) and can be used by UEs to demodulate data or control signals or to perform measurements. To reduce CRS overhead, an eNB may transmit a CSI-RS with a smaller density in the time and/or frequency domain than a CRS. For channel measurement, Non-Zero Power CSI-RS (NZP CSI-RS) resources can be used. For Interference Measurement Resources (IMRs), CSI Interference Measurement (CSI-IM) resources associated with a Zero Power CSI-RS (ZP CSI-RS) can be used as stated in REF 3. A UE can determine the CSI-RS transmission parameters through higher layer signaling from an eNB. The DMRS is transmitted only in the BW of a respective PDSCH and a UE can use the DMRS to demodulate information in a PDSCH.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one of more of eNBs 101, 102 and 103 are configured to perform for measurement and discovery for LTE Advanced signals. In addition, one of more of eNBs 101, 102 and 103 are configured to perform low overhead synchronization for beam-formed systems.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

UEs 111-116 may access voice, data, video, video conferencing, MMT content and/or other broadband services via one or more of eNBs 101-103, the network 130 or a combination thereof. In certain embodiments, one or more of UEs 111-116 may be associated with an access point (AP) of a Wireless Fidelity (WiFi) Wireless Local Area Network (WLAN).

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2:
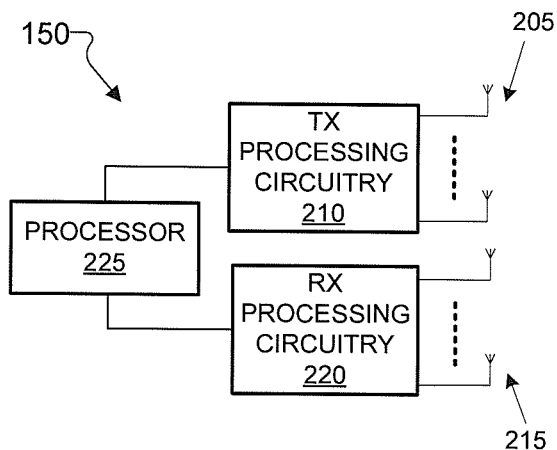
FIG. 2 illustrates a block diagram of an MPEG Media Transport (MMT) system configured to deliver a simplified content presentation according to this disclosure.

FIG. 2 illustrates a block diagram of an MMT system for simplified MMT content presentation according to this disclosure. The embodiment of the MMT system 150 shown in FIG. 2 is for illustration only. Other embodiments could be used without departing from the scope of the present disclosure.

The MMT system 150 can be in a wireless or a wired communication system that implements various embodiments of the present disclosure. The MMT system 150 is configured for simplified MMT content presentation in a wireless communications system, such as, for example, wireless system 100 in FIG. 1. The MMT system 150 includes transmit (TX) antennas 205, transmit (TX) processing circuitry 210, receive (RX) antennas 215, receive (RX) processing circuitry 220, and a processor 225.

TX processing circuitry 210, such as a transmitter, transmits MMT package Processing Units (MPUs). For example, the TX processing circuitry 210 transmits video, audio, and HTML 5 based content to a display device. TX processing circuitry 210 also can perform spatial multiplexing via layer mapping to different antennas in TX antennas 205 and different ports of antennas in TX antennas 205. In certain embodiments, the apparatus 200 transmits MPUs to a display device via a wired connection. RX processing circuitry 220, such as a receiver, receives a signal, via receive (RX) antennas 215, from a display device requesting MPUs. For example, the RX processing circuitry 220 receives a request for video, audio, and HTML 5 based content from a display device.

Processor 225 includes processing circuitry that controls the overall operation of the apparatus 200. In one such operation, processor 225 controls the transmission of MPUs to a display device. The processor 225 also identifies assets of an MPU, defines at least one of the assets as a default asset and defines the remaining assets as enriched assets. The processor 225 configures the default asset for independent presentation from the enriched assets, and controls the transmission of an MPU including the default asset and the enriched assets.

For example, a display device can receive a command to receive a presentation including video, audio, and HTML 5 content. The MMT system 150 receives a signal to transmit the presentation to the display device. The MMT system 150 identifies assets of one or more MPUs. The assets can be audio and video assets of an MPU. The MMT system 150 defines the audio and video assets as default assets. The default assets do not use a composition function. A composition function includes at least one of a spatial relationship between one or more assets, a temporal relationship between one or more assets, or an event based relationship between one or more assets and HTML 5 based content. The remaining assets (such as the assets not defined as default assets) can generally be defined as enriched assets. The enriched assets include a composition function. The default assets can be transmitted faster as well as processed and displayed quicker by a display device than the enriched assets due to their simplicity and because they do not use a composition function.

The MMT system 150 configures the default assets so that the default assets can be displayed independently or without reliance on other assets such as the enriched assets. Configuring the default assets to be displayed independently enables display devices, including display devices that are not configured to display enriched assets, to display the default assets regardless of whether enriched assets are received and displayed. The MMT system 150 also transmits an MPU including the default asset and the enriched assets to a display device for display of the presentation content.

The MMT system 150 also synchronizes the default assets with each other. For example, the MMT system 150 synchronizes an audio component presentation time of an audio component asset with a video component presentation time of a video component asset. Accordingly, when a display device displays the default audio and video assets, the audio and video components of the presentation will be properly aligned with each other.

By defining the default assets, synchronizing the asset with each, and configuring the default assets to operate independently, the MMT system 150 provides presentation content to a display device with relatively seamless transition. For example, when a display device initiates a presentation on a display, the initial streaming or downloading of the presentation content can generate a presentation delay (such as a temporary black screen). However, by defining some assets such as the audio and video assets as default assets, as discussed herein, the display device can quickly present at least the audio and video components of the presentation content to the display while the enriched content is still streaming or downloading. Thus, a prolonged black screen does not occur. The enriched content can be synchronized by the MMT system 150 such that when the streamed or downloaded enriched content is in a state to begin presentation by the display device, the enriched content is presented in the intended time in synchronization with the appropriate audio and video content. Furthermore, some display devices may not be capable of supporting enriched content. In these cases, by defining and configuring some assets such as the audio and video assets as default assets, as discussed herein, the display device still is able to play the default audio and video while discarding the enriched content.

In certain embodiments, the MPU can be one of plurality of MPUs so that the sequence of assets of each of the MPU is on an asset timeline. For example, a first MMT system 150 can transmit a first MPU and a second MMT system 150 can transmit a second MPU. The first MMT system 150 assigns a first position along an asset time for a particular asset of the first MPU and the second MMT system 150 assigns a second position along the asset time for the particular asset of the second MPU. Content of the particular asset of the first MPU does not overlap with content of the particular asset of the second MPU. By assigning a first position and a second position to an asset of two MPUs, the assets can be displayed by a display device in their intended order or position on a presentation display timeline. In certain embodiments, a single MMT system 150 can transmit multiple MPUs and assign different positions to assets of each MPU on an asset timeline.

Figure 3:
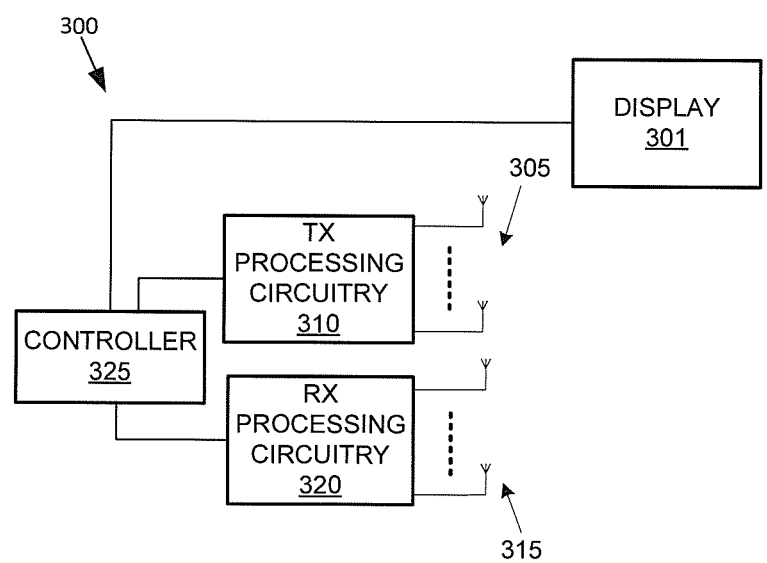
FIG. 3 illustrates a block diagram of a display device for simplified MPEG Media Transport (MMT) content presentation according to this disclosure.

FIG. 3 illustrates a block diagram of a display device 300 for simplified MPEG Media Transport (MMT) content presentation according to this disclosure. The embodiment of the display device 300 is for illustration only. Other embodiments could be used without departing from the scope of the present disclosure.

The display device 300 can be implemented in a wireless communication system that implements various embodiments of the present disclosure. The display device 300 is disposed at a communication point in a wireless communications system, such as, for example, wireless system 100 in FIG. 1. In certain embodiments, the display device 300 is a UE, such as a mobile station, subscriber station, tablet, a computer terminal, a television, and the like. In one example, the display device 300 is the UE 116 in FIG. 1. The display device 300 includes transmit (TX) antennas 305, transmit (TX) processing circuitry 310, receive (Rx) antennas 315, receive (Rx) processing circuitry 320, controller 325, and a display 301.

TX processing circuitry 310, such as a transmitter, transmits signals to at least one of the first MMT system 150 or the second MMT system 150 requesting MPEG Media Transport (MMT) package Processing Units (MPUs) for presentation content. TX processing circuitry 310 may also perform spatial multiplexing via layer mapping to different antennas in TX antennas 305 and different ports of antennas in TX antennas 305.

Rx processing circuitry 320, such as a receiver, receives from Rx antennas 315 incoming MPUs for presentation content transmitted by at least one of the first MMT system 150 or the second MMT system 150. Rx processing circuitry 320 processes the received signal(s) to identify the information transmitted by the transmission point(s).

Controller 325 includes a processor, multi-processing system, or processing circuitry and is configured to control the overall operation of display device 300. In one such operation, the controller 325 controls the reception of channel signals and the transmission of channel signals by Rx processing circuitry 320 and TX processing circuitry 310, in accordance with well-known principles. The controller 325 also controls the display 301 to display presentation content from MPUs transmitted from the MMT system 150.

MMT is a standard for Multimedia Delivery in an IP environment and a non IP environment. MMT generally has four functionalities including Encapsulation, Delivery, Signaling and Composition. Among the four functionalities, the purpose of composition is to provide the information required for MMT content consumption. Composition provides the spatial relation, the temporal relation, and the event based relation with HTML 5 and some tools. However, for simple A/V MMT contents, composition may not be necessary.

MMT provides a generic media streaming solution that supports the transport of any media type and codec. MMT defines a transport protocol (MMTP) that is designed to support a limited set of payload types regardless of the media type or coding format while also providing information serving the needs of different multimedia delivery services.

MMTP supports a streaming and a download mode, where the streaming mode is optimized for packetized streaming of ISO Base Media File formatted files (MPU mode). The download mode allows for flexible delivery of generic files (GFD mode). In addition, MMTP delivers streaming support data such as Forward Error Correction (FEC) repair data and signaling messages.

The collection of the media content and its related metadata builds an MMT Package. The MMT Package is delivered from one or more sending entities to the clients. Each media component of an MMT Package, such as a piece of audio or video content, constitutes an MMT asset. An asset is associated with an identifier that can be unrelated to its actual physical location or associated with a service provider that is offering the asset. The identifier allows an asset to be globally and uniquely identified. MMT does not specify a particular identification mechanism but allows the usage of URIs or UUIDs for this purpose. Each asset has its own timeline. For example, each asset can be of a different length than that of a whole presentation created by an MMT Package.

For delivery purposes, an asset is encoded in a particular encoding. The encoding can be subsequently segmented into multiple pieces, called MPUs for presentation purposes (such as to accommodate advertisement insertions). Each MPU constitutes a piece of an encoding of an asset that is consumed independently by the presentation engine of the client. For example, an MPU is formatted as a conformant ISO-Base Media File Format (ISO-BMFF) file. MPUs of the same encoding of an asset are non-overlapping in time. For example, two consecutive MPUs of the same encoding of an asset do not contain the same media samples.

Figure 4:
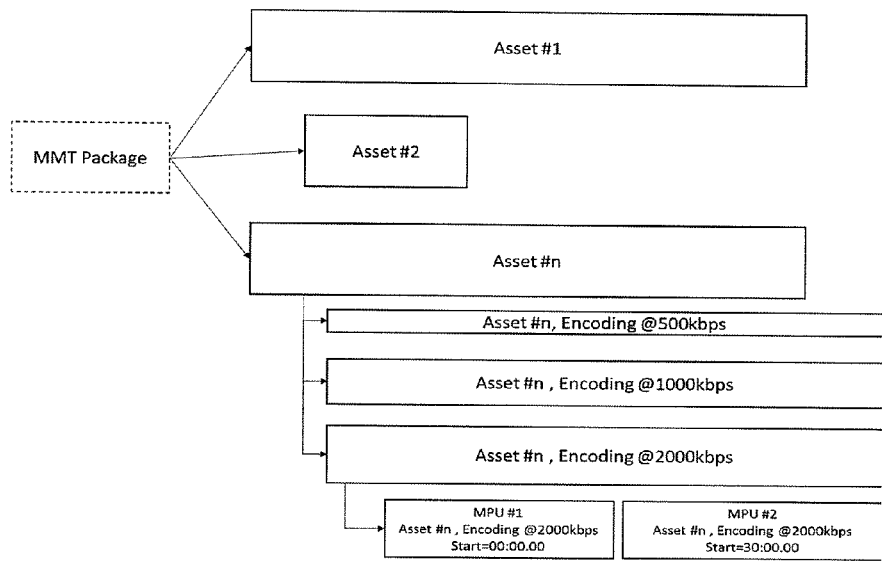
FIG. 4 illustrates an example relationship between an MMT package, assets, encodings, and MPUs according to this disclosure.

FIG. 4 illustrates an example relationship between an MMT package, assets, encodings, and MPUs according to this disclosure. The embodiment of the MMT relationships shown in FIG. 4 is for illustration only. Other embodiments could be used without departing from the scope of the present disclosure.

In MMT, data from one or more MPUs is streamed to the client using MMTP. In unicast, the streaming session is initiated by the client using an external session control protocol. In multicast/broadcast, clients discover an ongoing streaming session using MMT signaling or external signaling. In the absence of an external presentation description file, the client uses MMT signaling that describes the default audio and video components of the service to setup the media processing at the client properly. In this case, the default audio and video components use the same time reference (origin) for the asset timelines to enable audio/video synchronization. Through time synchronization across the sending entities, media content providers can ensure that the receiving entity will be able to maintain synchronized presentation of media data from MPUs of multiple assets. The presentation timeline governs the presentation of the MPUs of an MMT Package.

In certain embodiments, data is provided with an MPU providing the position of the MPU on an asset timeline. Definitions are provided as follows:
  Box Type: 'mmpu'
  Container: File
  Mandatory: Yes
  Quantity: One or more The MMT processing unit ('mmpu') box provides the asset identifier to which the current MPU belongs as well as the position of the current MPU on the asset timeline and other information of the current MPU. The asset identifier provides a globally unique identification of an asset. The MPU information includes the sequence number of the MPU in the corresponding asset. When the MMT processing unit is required to store the transport characteristics information together with MPU, the MMPU is stored in the 'meta' box at the file level.

An example syntax for the above mentioned embodiments is provided as follows:

```
aligned(8) class MPUBox
    extends FullBox('mmpu', version, 0){
```

```
        unsigned int(1)  is_complete;
        unsigned int(7)  reserved;
        unsigned int(32) mpu_sequence_number;
        if (version==1) {
            unsigned int(64) position_in_asset_presentation_time;
        } else {
            unsigned int(32) position_in_asset_presentation_time;
        }
        AssetIdentifierBox( );
    }
    aligned(8) class AssetIdentifierBox {
        unsigned int(32)  asset_ID_scheme;
        unsigned int(32)  asset_ID_length;
        unsigned int(8)   asset_ID_value[asset_ID_length];
    }
```

With reference to the above example syntax, the field "is_complete" indicates whether or not an MPU has all Media Fragment Units (MFUs) described by the MFU structure. The field "mpu_sequence_number" indicates the sequence number of the current MPU. For example, a first MPU in an asset has an mpu_sequence_number of '0'. Each subsequent MPU has an mpu_sequence_number incremented by '1' such that the second MPU has an mpu_sequence_number of '1' and the third MPU has an mpu_sequence_number of '2'. The field "position_in_asset_presentation_time" indicates an integer equal to the sum of the presentation time of all previous MPUs (with a sequence number smaller than the one of the current MPU) of the same encoding of an asset. The field "position_ID_scheme identifies the scheme of Asset ID used in asset_id_value. A plurality of schemes can be used to express an identification of content. For example, a scheme-length-value can be used to express an identification of content. When using a scheme-length-value to express an identification of content, a new identification scheme may not be necessary. Valid schemes are listed below in Table 1.

TABLE 1

| Value | Description |
|---|---|
| "UUID" | UUID |
| "URI" | URI |

An example syntax for the above mentioned embodiments is provided as follows:
   asset_ID_length—the length of asset_id_value.
   asset_ID_value—contains identifier for the Asset. Format of the value in this field is specific to the value in the asset_id_scheme field.

In certain embodiments, in order to enable consumption of basic MMT packages offering a limited set of media assets, such as with basic linear television services, MMT receivers identify default audio/video (and in some embodiments text) assets. The MMT receivers align their timelines for synchronous playback. The default assets are marked appropriately in an MPT table and the default assets that are marked have asset timelines with the same time origin. Furthermore, each MPU of the marked default assets carry their positions on the asset timeline in the "mmpu" box and the default asset flag is set to true or "1".

A complete MPT has information related to a package including a list of all the assets. A subset MPT has a portion of information of a complete MPT. MPT subset-0 has the minimum information used for packet consumption. Example syntax of an MPT is provided below in Table 2.

TABLE 2

| Syntax | Value | No. of bits | Mnemonic |
|---|---|---|---|
| MPT( ) { | | | |
|     table_id | | 8 | uimsbf |
|     version | | 8 | uimsbf |
|     length | | 16 | uimsbf |
|     reserved | '11 1111' | 6 | bslbf |
|     MPT_mode | | 2 | bslbf |
|     If (table_id == | | | |
|     SUBSET_0_MPT_TABLE_ID) { | N1 | | |
|         MMT_package_id { | | 8 | uimsbf |
|             MMT_package_id_length | | | |
|             for (i=0; i<N1; i++) { | | 8 | uimsbf |
|                 MMT_package_id_byte | | | |
|             } | | | |
|         } | | | |
|     } | N2 | | |
|     MPT_descriptors { | | 16 | uimsbf |
|         MPT_descriptors_length | | | |
|         for (i=0; i<N2; i++) { | | 8 | uimsbf |
|             MPT_descriptors_byte | | | |
|         } | | | |
|     } | N3 | | |
|     } | | 8 | uimsbf |
|     number_of_assets | | | |
|     for (i=0; i<N3; i++) { | N4 | | |
|         asset_id { | | 8 | uimsbf |
|             asset_id_length | | | |
|             for (j=0; j<N4; j++) { | | 8 | uimsbf |
|                 asset_id_byte | | | |
|         } | | 32 | uimsbf |
|         mime_type | | 1 | bslbf |
|         default_asset_flag | | | bslbf |
|         if(default_asset_flag == 1){ | ' | 32 | uimsbf |
|         MPU_sequence_number | | 64 | uimsbf |
|         presentation_time | | | |

TABLE 2-continued

| Syntax | Value | No. of bits | Mnemonic |
|---|---|---|---|
|       } | '00000' | 5 | bslbf |
|       reserved | | | |
|     } | | | |
|   } | | 7 | bslbf |
|   reserved | '1111 111' | 1 | bslbf |
|   asset_clock_relation_flag | | | |
|   if (asset_clock_relation_flag == 1) { | | 8 | uimsbf |
|     asset_clock_relation_id | | 7 | bslbf |
|     reserved | | 1 | bslbf |
|     asset_timescale_flag | | | |
|     if (asset_time_scale_flag == 1) { | | 32 | uimsbf |
|       asset_timescale | N6 | | |
|     } | | | |
|   } | | | |
|   asset_location { | | 8 | uimsbf |
|     location_count | | | |
|     for (i=0; i<N6; i++) { | | | |
|       MMT_general_location_info( ) | N5 | | |
|     } | | | |
|   } | | | |
|   asset_descriptors { | | 16 | uimsbf |
|     asset_descriptors_length | | | |
|     for (j=0; j<N5; j++) { | | 8 | uimsbf |
|       asset_descriptors_byte | | | |
|     } | | | |
|   } | | | |
|   } | | | |
| } | | | |

For the fields shown above in the example syntax of Table 2, the field "table_id" indicates the ID of the MPT. A complete MPT and each subset MPT use different table identifiers. A subset number of an MPT is implicitly represented by the "table_id" field. Because the "table_id" field values are assigned contiguously, the MPT subset number is deduced from the "table_id". For example, the MPT subset number is equal to the difference of the value of the "table_id" field and the "table_id" field of the base MPT. The MPT subset number is the subset number of a current MPT. The number "0" indicates the base MPT and the numbers "1" through "14" indicate different subset of the MPT. The number "15' indicates a complete MPT.

The field "version" indicates a version of the MPT. A newer version of the MPT overrides an older version of the MPT as soon as the newer version of the MPT is received, if the field "table_id" indicates a complete MPT (such as by indicating a value of "15"), if a subset-0 MPT has the same version value as the "table_id" field such as when the field "MPT_mode" has a value equal to one, if all MPT subsets with lower-subset numbers have the same version value the "table_id" field such as when the field "MPT_mode" has a value equal to zero, or if processing the MPT subsets are independent such as when the field "MPT_mode" has a value equal to two.

If subset-0 MPT has a newer version, all MPT subsets with higher subset values up to 14 previously stored within an MMT receiving unit are treated as outdated except when the field "MPT_mode" is in an independent mode. When the MPT subset value is not equal to zero and the field "MPT_mode" has a value equal to one, the contents of the MPT subset with a version different from that of subset-0 MPT stored in an MMT receiving entity is ignored. Also when the MPT subset value is not equal to zero and the field "MPT_mode" has a value equal to zero, the contents of the MPT subset with a version different from that of lower-subset MPT subsets stored in an MMT receiving entity is ignored. In an embodiment, a version change is incremented by modulo-256.

The field "length" indicates the length of the MPT in bytes. The "length" field counts from the beginning of the next field to the last byte of the MPT table. The value zero is never used for the field "length".

The field "MPT_mode" indicates a mode of an MPT subset processing when an MPT subset mechanism is used. In a sequential order processing mode and with a non-zero subset value of an MPT, an MMT receiving unit receives all MPT subsets with lower subset values that have the same version as a currently received MPT subset before the current MPT subset is processed. For example, an MMT receiving unit may not process a subset-3 MPT if the MMT receiving unit has not yet received a subset-2 MPT of the same version. In an order irrelevant processing mode and with a subset value of a current MPT set as a non-zero value, an MMT receiving unit processes a current MPT subset after or in response to receiving the current MPT subset as long as the subset-0 MPT stored in the MMT receiving unit has the same version of the current MPT subset.

In an independent processing mode, the version of each MPT subset is managed individually. In this mode, MPT components are fragmented such that each MPT subset is delivered by at least one of multiple MMT receiving units. The independent mode of MPT subsets is used for multi-channel instantiation. For example, MPT subsets from subset-0 MPT to subset-N MPT are assigned as logical channels from Channel-0 to Channel-N. When a media control interface (MCI) message carries both an MCIT subset and an associated MPT subset, a composition information mode (CI_mode) in the MCIT and the MPT_mode in the MPT have the same value. An example of values for different MPT modes is listed below in Table 3.

TABLE 3

| Value | Description |
|---|---|
| 00 | "sequential_order_processing_mode" |
| 01 | "order_irrelevant_processing_mode" |

TABLE 3-continued

| Value | Description |
|---|---|
| 10 | "independent_processing_mode" |
| 11 | Reserved |

The field "MMT_package_id" is a globally unique identifier of the package. The field "MMT_package_id" uses the UTF-8 character encoding. The field "MMT_package_id_length" is the length in bytes of an MMT_package_id string. The field "MMT_package_id_length" excludes a terminating null character. The field "MMT_package_id_byte" is a byte in an MMT_package_id string. The field "MMT_package_id_byte" does not include a terminating null character in the string. The field "MPT_descriptors" provides descriptors for an MPT. The field "MPT_descriptors_length" identifies a length of the descriptor syntax loop. The identified length of the descriptor syntax loop is counted from the next field to the end of the descriptor syntax loop. Several descriptors can be inserted in a syntax loop. For example, a syntax loop can include an additional package information URL descriptor. The additional package information URL descriptor indicates the URL of package information web page for a package.

The field "MPT_descriptors_byte" is one byte in the descriptors loop. The field "number_of_assets" indicates the number of assets whose information is provided by a particular MPT. The field "asset_id" indicates an asset identifier. The field "asset_id" is an ASCII string without the terminating null character that is equal to one of the identification attributes of the AI elements in composition information (CI). The field "asset_id_length" indicates the length in bytes of an "asset_id" field. The field "asset_id_byte" is a byte in an "asset_id" field. The field "mime_type" indicates a type of a MIME asset. The field "default_asset_flag" indicates that an asset belongs to a default asset of an MMT package if the "default_asset_flag" field has a value equal to zero. The field "MPU_sequence_number" is the sequence number of the MPU. An MPU_sequence_number field value is provided to an MCI at a time indicated by a "presentation_time" field. The "presentation_time" field is a presentation time of the first media sample of the MPU with the sequence value equal to an "MPU_sequence_number" field value of an asset having a value equal to one in the "default_asset_flag" field.

The "packet_id" field includes an identifier of the GFD session in an MMTP packet header. The field "asset_clock_relation_flag" indicates whether an asset uses a network time protocol (NTP) clock or another clock system as the clock reference. If the value of the "asset_clock_relation_flag" is equal to one, then an "asset_clock_relation_id" field is included in the asset transmission. If the value of the "asset_clock_relation_flag" is equal to zero, then the NTP clock is used for the asset. The field "asset_clock_relation_id" identifies a clock relation for an asset. The "asset_clock_relation_id" field references the clock relation delivered by a CRI_descriptor( ) of an asset. An "asset_clock_relation_id" field value is one of the clock_relation_id values provided by the CRI descriptors.

The field "asset_timescale_flag" indicates whether "asset_timescale" field information is provided. If the "asset_timescale_flag" field has a value equal to one, then the "asset_timescale" field is included. If the "asset_timescale_flag" field has a value equal to zero, then the "asset_timescale" field is 90,000 (90 kHz). The "location_count" indicates the number of location information for an asset. If the "location_count" field has a value equal to one, then an asset is delivered through one location. If the "location_count" field has a value other than one, then an asset is delivered through multiple channels or locations. In certain embodiments, delivering an asset through multiple channels or locations is called bulk delivery such that individual MPUs of an asset are delivered through multiple channels or locations. When one asset is delivered over multiple channels or locations, an MMT receiving entity receives all MPUs of the asset from all indicated channels or locations.

The field "asset_timescale" indicates information of a time unit for all timestamps used for the asset. The field "asset_timescale" is expressed in the number of units per second. The field "MMT_general_location_info_for_asset_location" indicates the location information of asset. General location reference information for an asset can be defined by 8.3.13.2 The location_type" field value to identify an asset location is between '0x00' and '0x06.' The field "asset_descriptors_length" identifies a number of bytes counted from the beginning of the next field to the end of an asset descriptors syntax loop. The field "asset_descriptors_byte" is a byte in asset descriptors.

In certain embodiments, a complete MPT includes information related to a package as well as a list of all the assets. A subset MPT has a portion of the information from a complete MPT. MPT subset-0 has the minimum information used for package consumption. Example syntax of an MPT is provided below in Table 4.

TABLE 4

| Syntax | Value | No. of bits | Mnemonic |
|---|---|---|---|
| MPT( ) { | | | |
|   table_id | | 8 | uimsbf |
|   version | | 8 | uimsbf |
|   length | | 16 | uimsbf |
|   reserved | '11 1111' | 6 | bslbf |
|   MPT_mode | | 2 | bslbf |
|   If (table_id == | | | |
|   SUBSET_0_MPT_TABLE_ID) { | N1 | | |
|     MMT_package_id { | | | |
|       MMT_package_id_length | | 8 | uimsbf |
|       for (i=0; i<N1; i++) { | | 8 | uimsbf |
|         MMT_package_id_byte | | | |
|       } | | | |
|     } | | | |
|   } | N2 | | |

TABLE 4-continued

| Syntax | Value | No. of bits | Mnemonic |
|---|---|---|---|
| MPT_descriptors { | | | |
|   MPT_descriptors_length | | 16 | uimsbf |
|   for (i=0; i<N2; i++) { | | 8 | uimsbf |
|     MPT_descriptors_byte | | | |
|   } | | | |
| } | N3 | | |
| } | | 8 | uimsbf |
| number_of_assets | | | |
| for (i=0; i<N3; i++) { | N4 | | |
|   asset_id { | | 8 | uimsbf |
|     asset_id_length | | | |
|     for (j=0; j<N4; j++) { | | 8 | uimsbf |
|       asset_id_byte | | | |
|     } | | 32 | uimsbf |
|     mime_type | | 1 | bslbf |
|     default_asset_flag | | | bslbf |
|     if(default_asset_flag == 1){ | N5 | | |
|     MPU_info_count | | | |
|       for (i=0;i<N5;i++) { | ' | 32 | uimsbf |
|         MPU_sequence_number | | 64 | uimsbf |
|         presentation_time | | | |
|       } | '00000' | 5 | bslbf |
|       reserved | | | |
|     } | | 7 | bslbf |
|   } | | | |
| } | '1111 111' | 1 | bslbf |
| reserved | | | |
| asset_clock_relation_flag | | | |
| if (asset_clock_relation_flag == 1) { | | 8 | uimsbf |
|   asset_clock_relation_id | | 7 | bslbf |
|   reserved | | 1 | bslbf |
|   asset_timescale_flag | | | |
|   if (asset_time_scale_flag == 1) { | | 32 | uimsbf |
|     asset_timescale | | | |
|   } | | | |
| } | | | |
| asset_location { | | 8 | uimsbf |
|   location_count | N6 | | |
|   for (i=0; i<N6; i++) { | | | |
|     MMT_general_location_info( ) | | | |
|   } | | | |
| } | | | |
| asset_descriptors { | | 16 | uimsbf |
|   asset_descriptors_length | N7 | | |
|   for (j=0; j<N7; j++) { | | 8 | uimsbf |
|     asset_descriptors_byte | | | |
|   } | | | |
| } | | | |
| } | | | |
| } | | | |

For the fields shown above in the example syntax of Table 4, the field "table_id" indicates the ID of the MPT. A complete MPT and each subset MPT use different table identifiers. A subset number of an MPT is implicitly represented by the "table_id" field. Because the "table_id" field values are assigned contiguously, the MPT subset number is deduced from the "table_id". For example, the MPT subset number is equal to the difference of the value of the "table_id" field and the "table_id" field of the base MPT. The MPT subset number is the subset number of a current MPT. The number "0" indicates the base MPT and the numbers "1" through "14" indicate different subset of the MPT. The number "15' indicates a complete MPT.

The field "version" indicates a version of the MPT. A newer version of the MPT overrides an older version of the MPT as soon as the newer version of the MPT is received, if the field "table_id" indicates a complete MPT (such as by indicating a value of "15"), if a subset-0 MPT has the same version value as the "table_id" field such as when the field "MPT_mode" has a value equal to one, if all MPT subsets with lower-subset numbers have the same version value the "table_id" field such as when the field "MPT_mode" has a value equal to zero, or if processing the MPT subsets are independent such as when the field "MPT_mode" has a value equal to two.

If subset-0 MPT has a newer version, all MPT subsets with higher subset values up to 14 previously stored within an MMT receiving unit are treated as outdated except when the field "MPT_mode" is in an independent mode. When the MPT subset value is not equal to zero and the field "MPT_mode" has a value equal to one, the contents of the MPT subset with a version different from that of subset-0 MPT stored in an MMT receiving entity is ignored. Also when the MPT subset value is not equal to zero and the field "MPT_mode" has a value equal to zero, the contents of the MPT subset with a version different from that of lower-subset MPT subsets stored in an MMT receiving entity is ignored. In an embodiment, a version change is incremented by modulo-256.

The field "length" indicates the length of the MPT in bytes. The "length" field counts from the beginning of the next field to the last byte of the MPT table. The value zero is never used for the field "length".

The field "MPT_mode" indicates a mode of an MPT subset processing when an MPT subset mechanism is used. In a sequential order processing mode and with a non-zero subset value of an MPT, an MMT receiving unit receives all MPT subsets with lower subset values that have the same version as a currently received MPT subset before the current MPT subset is processed. For example, an MMT receiving unit may not process a subset-3 MPT if the MMT receiving unit has not yet received a subset-2 MPT of the same version. In an order irrelevant processing mode and with a subset value of a current MPT set as a non-zero value, an MMT receiving unit processes a current MPT subset after or in response to receiving the current MPT subset as long as the subset-0 MPT stored in the MMT receiving unit has the same version of the current MPT subset.

In an independent processing mode, the version of each MPT subset is managed individually. In this mode, MPT components are fragmented such that each MPT subset is delivered by at least one of multiple MMT receiving units. The independent mode of MPT subsets is used for multi-channel instantiation. For example, MPT subsets from subset-0 MPT to subset-N MPT are assigned as logical channels from Channel-0 to Channel-N. When a media control interface (MCI) message carries both an MCIT subset and an associated MPT subset, a CI_mode in the MCIT and the MPT_mode in the MPT have the same value. An example of values for different MPT modes is listed below in Table 5.

TABLE 5

| Value | Description |
|-------|-------------|
| 00 | "sequential_order_processing_mode" |
| 01 | "order_irrelevant_processing_mode" |
| 10 | "independent_processing_mode" |
| 11 | Reserved |

The field "MMT_package_id" is a globally unique identifier of the package. The field "MMT_package_id" uses the UTF-8 character encoding. The field "MMT_package_id_length" is the length in bytes of an MMT_package_id string. The field "MMT_package_id_length" excludes a terminating null character. The field "MMT_package_id_byte" is a byte in an MMT_package_id string. The field "MMT_package_id_byte" does not include a terminating null character in the string. The field "MPT_descriptors" provides descriptors for an MPT. The field "MPT_descriptors_length" identifies a length of the descriptor syntax loop. The identified length of the descriptor syntax loop is counted from the next field to the end of the descriptor syntax loop. Several descriptors can be inserted in a syntax loop. For example, a syntax loop can include an additional package information URL descriptor. The additional package information URL descriptor indicates the URL of package information web page for a package.

The field "MPT_descriptors_byte" is one byte in the descriptors loop. The field "number_of_assets" indicates the number of assets whose information is provided by a particular MPT. The field "asset_id" indicates an asset identifier. The field "asset_id" is an ASCII string without the terminating null character that is equal to one of the identification attributes of the AI elements in CI. The field "asset_id_length" indicates the length in bytes of an "asset_id" field. The field "asset_id_byte" is a byte in an "asset_id" field. The field "mime_type" indicates a type of a MIME asset. The field "default_asset_flag" indicates that an asset belongs to a default asset of an MMT package if the "default_asset_flag" field has a value equal to zero. The field "MPU_info_count indicates the number of MPUs of a current asset for which presentation information is provided.

The field "MPU_sequence_number" is the sequence number of the MPU. An MPU_sequence_number field value is provided to an MCI at a time indicated by a "presentation_time" field. The "presentation_time" field is a presentation time of the first media sample of the MPU with the sequence value equal to an "MPU_sequence_number" field value of an asset having a value equal to one in the "default_asset_flag" field.

The "packet_id" field includes an identifier of the GFD session in an MMTP packet header. The field "asset_clock_relation_flag" indicates whether an asset uses a network time protocol (NTP) clock or another clock system as the clock reference. If the value of the "asset_clock_relation_flag" is equal to one, then an "asset_clock_relation_id" field is included in the asset transmission. If the value of the "asset_clock_relation_flag" is equal to zero, then the NTP clock is used for the asset. The field "asset_clock_relation_id" identifies a clock relation for an asset. The "asset_clock_relation_id" field references the clock relation delivered by a CRI_descriptor( ) of an asset. An "asset_clock_relation_id" field value is one of the clock_relation_id values provided by the CRI descriptors. (see subclause 8.3.13.1).

The field "asset_timescale_flag" indicates whether "asset_timescale" field information is provided. If the "asset_timescale_flag" field has a value equal to one, then the "asset_timescale" field is included. If the "asset_timescale_flag" field has a value equal to zero, then the "asset_timescale" field is 90,000 (90 kHz). The "location_count" indicates the number of location information for an asset. If the "location_count" field has a value equal to one, then an asset is delivered through one location. If the "location_count" field has a value other than one, then an asset is delivered through multiple channels or locations. In an embodiment, delivering an asset through multiple channels or locations is called bulk delivery such that individual MPUs of an asset are delivered through multiple channels or locations. When one asset is delivered over multiple channels or locations, an MMT receiving entity receives all MPUs of the asset from all indicated channels or locations.

The field "asset_timescale" indicates information of a time unit for all timestamps used for the asset. The field "asset_timescale" is expressed in the number of units per second. The field "MMT_general_location_info_for_asset_location" indicates the location information of asset. General location reference information for an asset can be defined by 8.3.12.2. The "location_type" field value to identify an asset location is between '0x00' and '0x06.' The field "asset_descriptors_length" identifies a number of bytes counted from the beginning of the next field to the end of an asset descriptors syntax loop. The field "asset_descriptors_byte" is a byte in asset descriptors.

Figure 5:
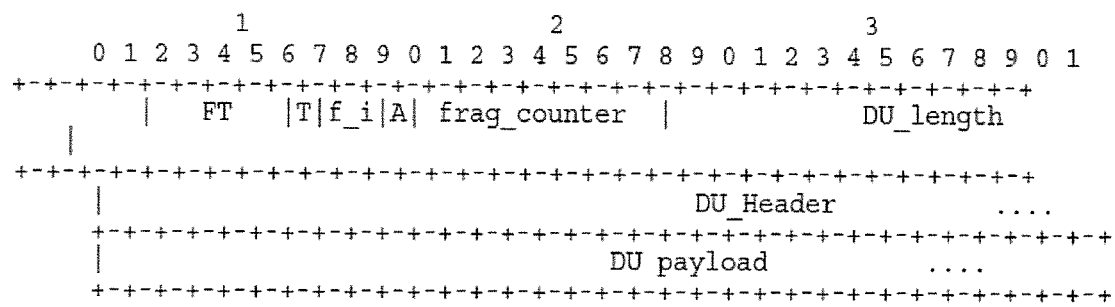
FIG. 5 illustrates an example structure of an MMT payload header according to this disclosure.

In an embodiment, presentation time is included in an MPU header. FIG. 5 illustrates an example structure of an MMT payload header according to this disclosure. For a payload that carries an MFU, additional information is provided depending on the value of the "T" flag. FIG. 6 illustrates an example structure of a timed media MFU header according to this disclosure, while FIG. 7 illustrates an example structure of a non-timed media MFU header according to this disclosure.

The field "MPU fragment type" indicates the fragment type and takes a value from Table 6 illustrated below.

TABLE 6

| FT | Description | Content |
|---|---|---|
| 0 | MPU metadata | contains the ftyp, mmpu, and moov boxes as well as any other boxes that appear in between. |
| 1 | Movie fragment metadata | contains the moof box and the mdat box, excluding all media data inside the mdat box. |
| 2 | MFU | contains a sample or sub-sample of timed media data or an item of non-timed media data. |
| 3 | Reserved for private use | reserved |

The field "timed flag" is a one bit field that indicates if the fragment is from an MPU that carries a timed value. If the "timed flag" field value is equal to zero, then the MPU carries timed media. If the "time flag" field value is equal to one, then the MPU carries a non-timed media. The field "f_i" is a two bit field that indicates whether a fragmentation indicator includes information about a fragmentation of a data unit in the payload. Table 7 illustrated below lists four example "f_i" field values.

TABLE 7

| Value | Description |
|---|---|
| 00 | Payload contains one or more complete data units. |
| 01 | Payload contains the first fragment of data unit |
| 10 | Payload contains a fragment of data unit that is neither the first nor the last part. |
| 11 | Payload contains the last fragment of data unit. |

Flags are used to indicate the presence of various information carried in an MMT payload. These flags can be set simultaneously in the MMT payload. The field "aggregation_flag" is a one bit field that indicates when more than one data unit is present in the payload. For example, when the "aggregation_flag" field has a value equal to one, the "aggregation_flag" field indicates that more than one data unit is present in the payload such that multiple data units are aggregated. The "fragment_counter" field is an 8 bit field that specifies the number of payloads containing fragments of the same data unit a current MMT payload is succeeded. The "fragment_counter" field has a value equal to zero if the "aggregation_flag" field has a value equal to one.

The field "DU_length" is a 16 bit field that indicates the length of the data following the "DU_length" field. When the "aggregator_length" field has a value equal to zero, the "DU_length" field is not provided. However, when the "aggregator_length" field has a value equal to one, the "DU_length" field appears as many times in the payload as the number of data units aggregated in the payload. The "DU_length" field precedes each aggregated data unit. The field "DU_Header" is the header of the data unit. The "DU_Header" field depends on the FT field. A header is only defined for the MFU fragment type, with different semantics for timed and non-timed media as identified by the T flag.

The field "MPU_sequence_number" is a 32-bit field indicating the sequence number of the MPU to which this MPU fragment belongs. The field "movie_fragment_sequence_number" is a 32 bit field indicating the sequence number of the movie fragment to which the media data of this MFU belongs. The field "sample_number" is a 32 bit indicating the sample number of the sample to which the media data of the MFU.

The field "Offset" is a 16 bit field that offsets the media data of an MFU inside the referenced sample. The field "subsample_priority" field is an eight bit filed indicating a priority of the media data carried by this MFU compared to other media data carried by the same MPU. The "subsample_priority" field value is between 0 and 255 such that the higher values indicate a higher priority. The field "dependency_counter" is an eight bit field that indicates the number of data units that depend on their media processing upon the media data in an MFU. The field "Item_ID" is a 32 bit field that identifies the item that is carried as part of an MFU.

The field "presentation_timestamp" is a 64-bit field that provides a presentation timestamp of the first media sample in the MPU. The timestamp is provided as NTP timestamp indicating the UTC time. If present, presentation information provided by a presentation layer overrides this information. For an FT type one, no additional DU header is available. A RAP flag is set to mark data units of FT having a value of zero and one as well as for MFUs that contain a sync sample or a fragment thereof, in the case of timed media, and for the primary item of non-timed MPUs.

In certain embodiment, presentation time is identified with a descriptor. By identifying a presentation time with a descriptor the addition of a presentation time can be automatically controller. "Automatically" is defined as without human intervention and without intervention from another entity. Example syntax of an MPT is provided below in Table 8.

TABLE 8

| Syntax | Value | No. of bits | Mnemonic |
|---|---|---|---|
| MPT( ) { | | | |
|   table_id | | 8 | uimsbf |
|   version | | 8 | uimsbf |
|   length | | 16 | uimsbf |
|   reserved | '11 1111' | 6 | bslbf |
|   MPT_mode | | 2 | bslbf |
|   If (table_id == | | | |
|   SUBSET_0_MPT_TABLE_ID) { | N1 | | |
|     MMT_package_id { | | | |
|       MMT_package_id_length | | 8 | uimsbf |
|       for (i=0; i<N1; i++) { | | 8 | uimsbf |
|         MMT_package_id_byte | | | |
|       } | | | |
|     } | | | |
|   } | N2 | | |
|   MPT_descriptors { | | 16 | uimsbf |
|     MPT_descriptors_length | | | |

TABLE 8-continued

| Syntax | Value | No. of bits | Mnemonic |
|---|---|---|---|
|       for (i=0; i<N2; i++) { | | 8 | uimsbf |
|         MPT_descriptors_byte | | | |
|       } | | | |
|    } | N3 | | |
| } | | 8 | uimsbf |
| number_of_assets | | | |
| for (i=0; i<N3; i++) { | N4 | | |
|    asset_id { | | 8 | uimsbf |
|       asset_id_length | | | |
|       for (j=0; j<N4; j++) { | | 8 | uimsbf |
|         asset_id_byte | | | |
|       } | | 32 | uimsbf |
|       mime_type | | 1 | bslbf |
|       default_asset_flag | | | bslbf |
|       if(default_asset_flag == 1){ | | | |
|       MPU Timestamp descriptor ( ) | | | |
|       } | '00000' | | |
|    } | | 5 | bslbf |
|    reserved | | | |
|    } | | | |
| } | '1111 111' | 7 | bslbf |
| reserved | | 1 | bslbf |
| asset_clock_relation_flag | | | |
| if (asset_clock_relation_flag == 1) { | | | |
|    asset_clock_relation_id | | 8 | uimsbf |
|    reserved | | 7 | bslbf |
|    asset_timescale_flag | | 1 | bslbf |
|    if (asset_time_scale_flag == 1) { | | | |
|       asset_timescale | | 32 | uimsbf |
|    } | | | |
| } | | | |
| asset_location { | | | |
|    location_count | N6 | 8 | uimsbf |
|    for (i=0; i<N6; i++) { | | | |
|       MMT_general_location_info( ) | | | |
|    } | | | |
| } | | | |
| asset_descriptors { | | | |
|    asset_descriptors_length | N7 | 16 | uimsbf |
|    for (j=0; j<N7; j++) { | | | |
|       asset_descriptors_byte | | 8 | uimsbf |
|    } | | | |
| } | | | |
| } | | | |
| } | | | |

For the fields shown above in the example syntax of Table 8, the field "table_id" indicates the ID of the MPT. A complete MPT and each subset MPT use different table identifiers. A subset number of an MPT is implicitly represented by the "table_id" field. Because the "table_id" field values are assigned contiguously, the MPT subset number is deduced from the "table_id". For example, the MPT subset number is equal to the difference of the value of the "table_id" field and the "table_id" field of the base MPT. The MPT subset number is the subset number of a current MPT. The number "0" indicates the base MPT and the numbers "1" through "14" indicate different subset of the MPT. The number "15' indicates a complete MPT.

The field "version" indicates a version of the MPT. A newer version of the MPT overrides an older version of the MPT as soon as the newer version of the MPT is received, if the field "table_id" indicates a complete MPT (such as by indicating a value of "15"), if a subset-0 MPT has the same version value as the "table_id" field such as when the field "MPT_mode" has a value equal to one, if all MPT subsets with lower-subset numbers have the same version value the "table_id" field such as when the field "MPT_mode" has a value equal to zero, or if processing the MPT subsets are independent such as when the field "MPT_mode" has a value equal to two.

If subset-0 MPT has a newer version, all MPT subsets with higher subset values up to 14 previously stored within an MMT receiving unit are treated as outdated except when the field "MPT_mode" is in an independent mode. When the MPT subset value is not equal to zero and the field "MPT_mode" has a value equal to one, the contents of the MPT subset with a version different from that of subset-0 MPT stored in an MMT receiving entity is ignored. Also when the MPT subset value is not equal to zero and the field "MPT_mode" has a value equal to zero, the contents of the MPT subset with a version different from that of lower-subset MPT subsets stored in an MMT receiving entity is ignored. In an embodiment, a version change is incremented by modulo-256.

The field "length" indicates the length of the MPT in bytes. The "length" field counts from the beginning of the next field to the last byte of the MPT table. The value zero is never used for the field "length".

The field "MPT_mode" indicates a mode of an MPT subset processing when an MPT subset mechanism is used. In a sequential order processing mode and with a non-zero subset value of an MPT, an MMT receiving unit receives all MPT subsets with lower subset values that have the same version as a currently received MPT subset before the current MPT subset is processed. For example, an MMT receiving unit may not process a subset-3 MPT if the MMT receiving unit has not yet received a subset-2 MPT of the same version. In an order irrelevant processing mode and with a subset value of a current MPT set as a non-zero value, an MMT receiving unit processes a current MPT subset after or in response to receiving the current MPT subset as long as the subset-0 MPT stored in the MMT receiving unit has the same version of the current MPT subset.

In an independent processing mode, the version of each MPT subset is managed individually. In this mode, MPT components are fragmented such that each MPT subset is delivered by at least one of multiple MMT receiving units. The independent mode of MPT subsets is used for multi-channel instantiation. For example, MPT subsets from subset-0 MPT to subset-N MPT are assigned as logical channels from Channel-0 to Channel-N. When a media control interface (MCI) message carries both an MCIT subset and an associated MPT subset, a CI_mode in the MCIT and the MPT_mode in the MPT have the same value. An example of values for different MPT modes is listed below in Table 9.

TABLE 9

| Value | Description |
|-------|-------------|
| 00 | "sequential_order_processing_mode" |
| 01 | "order_irrelevant_processing_mode" |
| 10 | "independent_processing_mode" |
| 11 | Reserved |

The field "MMT_package_id" is a globally unique identifier of the package. The field "MMT_package_id" uses the UTF-8 character encoding. The field "MMT_package_id_length" is the length in bytes of an MMT_package_id string. The field "MMT_package_id_length" excludes a terminating null character. The field "MMT_package_id_byte" is a byte in an MMT_package_id string. The field "MMT_package_id_byte" does not include a terminating null character in the string. The field "MPT_descriptors" provides descriptors for an MPT. The field "MPT_descriptors_length" identifies a length of the descriptor syntax loop. The identified length of the descriptor syntax loop is counted from the next field to the end of the descriptor syntax loop. Several descriptors can be inserted in a syntax loop. For example, a syntax loop can include an additional package information URL descriptor. The additional package information URL descriptor indicates the URL of package information web page for a package.

The field "MPT_descriptors_byte" is one byte in the descriptors loop. The field "number_of_assets" indicates the number of assets whose information is provided by a particular MPT. The field "asset_id" indicates an asset identifier. The field "asset_id" is an ASCII string without the terminating null character that is equal to one of the identification attributes of the AI elements in CI. The field "asset_id_length" indicates the length in bytes of an "asset_id" field. The field "asset_id_byte" is a byte in an "asset_id" field. The field "mime_type" indicates a type of a MIME asset. The field "default_asset_flag" indicates that an asset belongs to a default asset of an MMT package if the "default_asset_flag" field has a value equal to zero. The field "MPU_info_count indicates the number of MPUs of a current asset for which presentation information is provided.

The field "MPU_sequence_number" is the sequence number of the MPU. An MPU_sequence_number field value is provided to an MCI at a time indicated by a "presentation_time" field. The "presentation_time" field is a presentation time of the first media sample of the MPU with the sequence value equal to an "MPU_sequence_number" field value of an asset having a value equal to one in the "default_asset_flag" field.

The "packet_id" field includes an identifier of the GFD session in an MMTP packet header. The field "asset_clock_relation_flag" indicates whether an asset uses an NTP clock or another clock system as the clock reference. If the value of the "asset_clock_relation_flag" is equal to one, then an "asset_clock_relation_id" field is included in the asset transmission. If the value of the "asset_clock_relation_flag" is equal to zero, then the NTP clock is used for the asset. The field "asset_clock_relation_id" identifies a clock relation for an asset. The "asset_clock_relation_id" field references the clock relation delivered by a CRI_descriptor( ) of an asset. An "asset_clock_relation_id" field value is one of the clock_relation_id values provided by the CRI descriptors. (see sub-clause 8.3.13.2).

The field "asset_timescale_flag" indicates whether "asset_timescale" field information is provided. If the "asset_timescale_flag" field has a value equal to one, then the "asset_timescale" field is included. If the "asset_timescale_flag" field has a value equal to zero, then the "asset_timescale" field is 90,000 (90 kHz). The "location_count" indicates the number of location information for an asset. If the "location_count" field has a value equal to one, then an asset is delivered through one location. If the "location_count" field has a value other than one, then an asset is delivered through multiple channels or locations. In certain embodiments, delivering an asset through multiple channels or locations is called bulk delivery such that individual MPUs of an asset are delivered through multiple channels or locations. When one asset is delivered over multiple channels or locations, an MMT receiving entity receives all MPUs of the asset from all indicated channels or locations.

The field "asset_timescale" indicates information of a time unit for all timestamps used for the asset. The field "asset_timescale" is expressed in the number of units per second. The field "MMT_general_location_info_for_asset_location" indicates the location information of asset. General location reference information for an asset can be defined by 8.3.13.2. The "location_type" field value to identify an asset location is between '0x00' and '0x06.' The field "asset_descriptors_length" identifies a number of bytes counted from the beginning of the next field to the end of an asset descriptors syntax loop. The field "asset_descriptors_byte" is a byte in asset descriptors.

Table 10 shown below illustrates an example structure of an MPU timestamp descriptor.

TABLE 10

| Syntax | No. of bits | Mnemonic |
|--------|-------------|----------|
| MPU_Timestamp_descriptor ( ) { | | |
|   descriptor_tag | 16 | uimsbf |
|   descriptor_length | 8 | uimsbf |
|   for (i=0; i<N; i++) { | | |
|     mpu_sequence_number | 32 | uimsbf |
|     mpu_presentation_time | 64 | uimsbf |
|   } | | |
| } | | |

For the fields shown above in the example structure of Table 10, the field "descriptor_tag" indicates the type of descriptor based on a value. The field "descriptor_length" is a field that indicates the length in bytes counting from the next byte after the "descriptor_length" field to the last byte of the descriptor. The field "mpu_sequence_number" is a field indicating the sequence number of the MPU presented at a time given an "mpu_presentation_time" field. The "mpu_presentation_time" field is a 64-bit NTP time stamp formatted field that indicates the presentation time of the first asset unit in the designated MPU.

Figure 8:
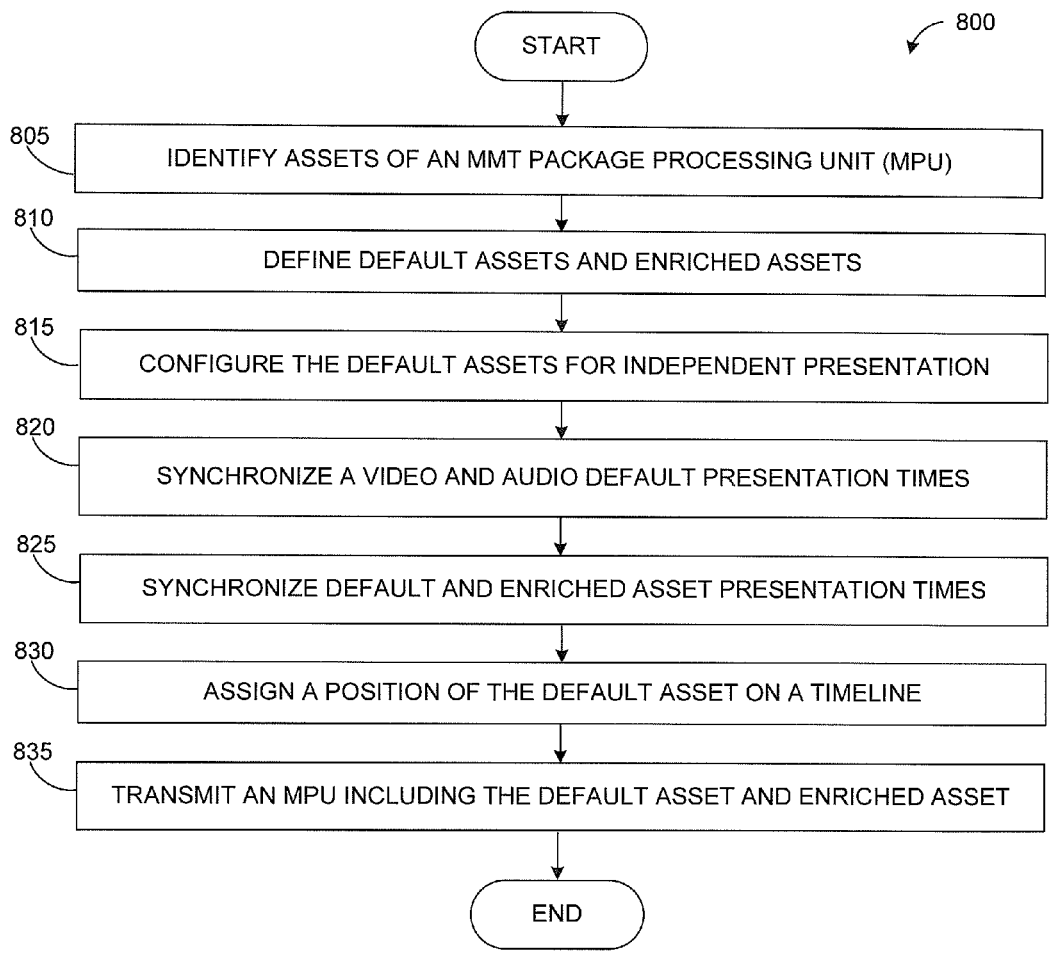
FIG. 8 is an example method for simplified MPEG Media Transport (MMT) content presentation according to this disclosure.

FIG. 8 is an example method 800 for simplified MPEG Media Transport (MMT) content presentation according to this disclosure. While the flow charts depict a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The processes depicted in the examples depicted are implemented by a transmitter chain in, for example, a MMT system.

In block 805, a processor of an apparatus identifies two or more assets of an MPEG Media Transport (MMT) package Processing Unit (MPU). In block 810, the processor of the MMT system defines at least one of the two or more assets as a default asset and a remaining one or more assets as enriched assets. The at least one default asset does not include a composition function. In certain embodiment, the at least one default asset includes at least two default assets: a video component asset and an audio component asset. The composition function includes at least one of a spatial relationship between one or more assets, a temporal relationship between one or more assets, or an event based relationship between one or more assets and HTML 5 based content. In certain embodiments, the one or more enriched assets do include the composition function.

In block 815, the processor of the MMT system configures the at least one default asset for independent presentation from the one or more enriched assets. In block 820, the processor of the MMT system synchronizes an audio component presentation time of the audio component asset with a video component presentation time of the video component asset before transmitting the MPU. In block 825, the processor of the MMT system synchronizes a default asset presentation time of the at least one default asset and an enriched asset presentation time of the one or more enriched assets.

In block 830, the processor of the MMT system assigns a position of the at least one default asset on an asset timeline shared with at least one asset of another MPU. In block 835, the processor of the MMT system transmits the MPU including the at least one default asset and the one or more enriched assets. In certain embodiments, transmitting the MPU comprises streaming the MPU using a MMT protocol (MMTP).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for simplified content presentation, the method comprising:
   identifying two or more media components of a MPEG Media Transport (MMT) package Processing Unit (MPU), the MPU comprising video, audio and HTML 5 based content;
   indicating at least one of the two or more components as a default service component and a remaining one or more components as enriched components,
   wherein the default service component comprises the video and the audio,
   wherein the enriched components include the HTML 5 based content and a composition function, wherein the composition function comprises a spatial relationship between the default service component and the enriched components;
   configuring the default component for independent presentation from the enriched components;
   transmitting media data of the one or more components including the default component and the enriched components; and
   providing an asset identifier to which a current MPU belongs as well as a position of the current MPU on an asset timeline, wherein the asset identifier provides a globally unique identification of a media component.

2. The method of claim 1, further comprising:
   providing other information of the current MPU, wherein the other information of the current MPU includes a sequence number of the current MPU in the media component.

3. The method of claim 1, further comprising synchronizing an audio component presentation time with a video component presentation time before transmitting media data of the one or more components.

4. The method of claim 1, further comprising synchronizing a default service component presentation time of the default component and an enriched component presentation time of the one or more enriched components.

5. The method of claim 1, wherein the one or more enriched components comprises the composition function.

6. The method of claim 2, wherein a syntax for the MPU is:
   aligned(8) class MPUBox
      extends FullBox('mmpu', version, 0){
      unsigned int(1) is_complete;
      unsigned int(7) reserved;
      unsigned int(32) mpu_sequence_number;
      if (version==1){
      unsigned int(64) position_in_asset_presentation_time;
      } else {
      unsigned int(32) position_in_asset_presentation_time;
      }
   AssetIdentifierBox( );
   }.

7. The method of claim 6, further comprising a timestamp descriptor including a 32 bit mpu sequence number and a 64 bit mpu presentation time.

8. The method of claim 6, wherein is complete indicates whether or not an MPU has all Media Fragment Units (MFUs) described by an MFU structure.

9. An apparatus for simplified content presentation, the apparatus comprising:
   a processor configured to:
      identify two or more media components of a MPEG Media Transport (MMT) package Processing Unit (MPU), the MPU comprising video, audio and HTML 5 based content;
      define at least one of the two or more components as a default service component and the remaining one or more components as enriched components,
      wherein the default service component comprises the video and the audio,
      wherein the enriched component includes include the HTML 5 based content and a composition function, wherein the composition function comprises a spatial relationship between the default service component and the enriched components;
indicate the default component using a default asset tag;
configure the default component for independent presentation from the enriched components;
provide an asset identifier to which a current MPU belongs as well as a position of the current MPU on an asset timeline, wherein the asset identifier provides a globally unique identification of a media component; and
a transmitter configured to transmit media data of the one or more components including the default component and the enriched components.

10. The apparatus of claim 9, wherein the processor is further configured to provide other information of the current MPU, wherein the other information of the current MPU includes a sequence number of the current MPU in the media component.

11. The apparatus of claim 9, wherein the processor is further configured to synchronize an audio component presentation time with a video component presentation time before transmitting media data of the one or more components.

12. The apparatus of claim 9, wherein the processor is further configured to synchronize a default component presentation time of the default service component and an enriched component presentation time of the one or more enriched components.

13. The apparatus of claim 9, wherein the one or more enriched components comprise the composition function.

14. The apparatus of claim 10, wherein a syntax for the MPU is:
aligned(8) class MPUBox
    extends FullBox('mmpu', version, 0){
    unsigned int(1) is_complete;
    unsigned int(7) reserved;
    unsigned int(32) mpu_sequence_number;
    if (version==1) {
    unsigned int(64) position_in_asset_presentation_time;
    } else {
    unsigned int(32) position_in_asset_presentation_time;
    }
    AssetIdentifierBox( );
}.

15. The apparatus of claim 14, wherein the processor is further configured to Include a timestamp descriptor including a 32 bit mpu sequence number and a 64 bit mpu presentation time.

16. The apparatus of claim 14, wherein the processor is configured to indicate whether or not an MPU has all Media Fragment Units (MFUs) described by an MFU structure in a "is complete" field.

17. A system for simplified content presentation, the system comprising:
a first device configured to:
transmit a first set of one or more components of a MPEG Media Transport (MMT) package Processing Units (MPU) including a default service component and one or more enriched components to a receiver of a display device,
wherein the default service component of the first set of MPUs comprises at least a video component and an audio component, is assigned a first position on a default service component timeline, and
wherein the one or more enriched components include remaining media data and a composition function, wherein the composition function comprises a spatial relationship between the default service component and the enriched components; and
a second device configured to:
transmit a second set of MPUs including a default service component of the second set of MPUs and one or more enriched components of the second set of MPUs to the receiver of the display device,
wherein the default service component of the second set of MPUs is assigned a second position on the default service component timeline so that after the receiver of the display device receives the default service component of the first set of MPUs and the default service component of the second set of MPUs, the display device displays the contents of the default service component of the first set of MPUs and the contents of the default service component of the second set of MPUs at relative times on the default service component timeline determined by the first position and the second position,
wherein at least one of the first device and the second device is configured to provide an asset identifier to which a current MPU belongs as well as a position of the current MPU on an asset timeline, wherein the asset identifier provides a globally unique identification of a media component.

18. The system of claim 17, wherein at least one of the first device and the second device is configured to provide other information of the current MPU, wherein the other information of the current MPU includes a sequence number of the current MPU in the media component.

19. The system of claim 17, wherein the default service component of the first set of MPUs comprises at least two default service components of the first set of MPUs: a first video component asset and a first audio component asset, and wherein the default service component of the second set of MPUs comprises at least two default service components of the second set of MPUs: a second video component asset and a second audio component asset.

20. The system of claim 19, wherein the first device is configured to synchronize a first audio component presentation time of the first audio component asset with a first video component presentation time of the first video component asset before transmitting the first set of media data of the one or more components, and wherein the second device is configured to synchronize a second audio component presentation time of the second audio component asset with a second video component presentation time of the second video component asset before transmitting the second set of media data of the one or more components.

* * * * *